United States Patent [19]
Eskew et al.

[11] Patent Number: 5,288,108
[45] Date of Patent: Feb. 22, 1994

[54] BELL JOINT REPAIR CLAMP

[75] Inventors: Sam Eskew, Atlanta, Ga.; William L. Kane, Aurora, Ill.

[73] Assignee: Cascade Waterworks Manufacturing Co., Yorkville, Ill.

[21] Appl. No.: 956,378

[22] Filed: Oct. 5, 1992

[51] Int. Cl.$^5$ .......................... F16L 55/18; F16L 21/06
[52] U.S. Cl. ...................................... 285/15; 285/373; 24/279; 138/99
[58] Field of Search ................. 285/197, 15, 373, 419, 285/420, 156; 24/279; 138/99

[56] References Cited

U.S. PATENT DOCUMENTS

| | | | |
|---|---|---|---|
| 793,135 | 6/1905 | Kellogg | 285/373 |
| 797,914 | 8/1905 | Rochat | 285/373 |
| 873,689 | 12/1907 | Van Winkle | 285/197 |
| 2,286,751 | 6/1942 | Merrill | 138/99 |
| 3,017,204 | 1/1962 | Smith | 285/373 |
| 3,078,108 | 2/1963 | Smith | 285/373 |
| 3,396,753 | 8/1968 | Foster | 138/99 |
| 4,768,813 | 9/1988 | Timmons | 285/197 |
| 4,889,167 | 12/1989 | Morris | 24/279 |
| 5,040,828 | 8/1991 | Kane | 285/197 |

OTHER PUBLICATIONS

*Pipe Fittings and Fabrications,* Price Book effective Jan. 3, 1989, JCM Industries, Inc., Nash Tex., Jan. 3, 1989.
*Style 126 Dresser Bell-Pack Sleeves,* Dresser Industries, Inc., Bradford, Pa. (date unknown).

Primary Examiner—Eric K. Nicholson
Attorney, Agent, or Firm—Emrich & Dithmar

[57] ABSTRACT

A bell joint repair clamp includes first and second semi-cylindrical sleeve members adapted for secure coupling by lug members drawn together by bolts for positioning about a leaking bell joint. Disposed intermediate the bell joint and coupled sleeve members is a sealing gasket preferably formed of a pair of gasket members each having a trapezoidal cross section and comprised of a deformable, compressible material to allow the gasket members to assume the shape of and engage the spigot and bell-shaped ends of the connected pipe sections in a tight-fitting manner. Opposed ends of the coupled sleeve members are each provided with a retaining plate and pipe clamping arrangement for confining the gasket in a sealed manner between the sleeve members and circumferentially about the bell joint for sealing a leak therein.

15 Claims, 3 Drawing Sheets

BELL JOINT REPAIR CLAMP

FIELD OF THE INVENTION

This invention relates generally to the repair of a leak at the joint of connected pipes, or conduits, and is particularly directed to the repair of a leak in a bell joint of a pipeline.

BACKGROUND OF THE INVENTION

Fluid leakage is a common problem in pipelines, particularly in older pipelines which typically employ materials of limited ductility and are thus highly subject to damage such as caused by impact, ground movement or shock. Currently available pipe clamps for repairing high pressure pipelines are generally expensive to manufacture, difficult and awkward to install, and of limited reliability. This is particularly true in the case of repair clamps for repairing and sealing a leak in a bell joint comprised of a spigot end of one pipe inserted in a sealed manner in the bell end of another pipe. Bell, or flange, joints are a common approach to connecting two pipes in a sealed manner. However, the bell end portion of the pipe is subject to splitting resulting in leakage.

A common approach to repairing a leaking bell joint requires the pipeline to be shut down and de-watered. The leaking bell joint is then removed from the pipeline by cutting respective ends of adjacent pipeline sections forming the bell joint and inserting a new sleeve between the severed ends of adjacent pipeline sections. The repair sleeve approach thus results in two pipeline joints subject to leakage rather than the single coupling of the thus removed bell joint. Not only is this approach of limited reliability, but it is difficult and time consuming because of the requirement to remove the leaking bell joint.

Other repair approaches allow the leaking bell joint to remain in the pipeline and attempt to confine the leak by means of a sleeve disposed about and encompassing the leaking bell joint. A sleeve housing generally includes opposed apertures for receiving the spigot and bell joint ends of the coupled pipeline sections and is typically comprised of two semi-cylindrical sections which are adapted for connection and sealed contact. The bell joint sleeve thus forms a hollow enclosure about the bell joint in an attempt to confine the pipeline contents and prevent further leakage. However, the bell joint sleeve itself is subject to leakage particularly at its two gasketed ends and along the longitudinal seams join the semi-cylindrical sleeve halves.

OBJECTS AND SUMMARY OF THE INVENTION

The present invention addresses the aforementioned limitations of the prior art by providing a bell joint repair clamp which includes first and second sleeve members adapted for tight-fitting mutual engagement about the bell joint and including opposed ends disposed about and in sealed engagement with the two coupled pipeline sections. The bell joint repair clamp further includes a compressible gasket member disposed within the two sleeve members in a tightly confined manner for securely engaging and tightly conforming to the contour of the bell joint and preventing further leakage therefrom.

Accordingly, it is an object of the present invention to provide an improved bell joint repair clamp.

It is another object of the present invention to seal a leak in a conduit bell joint without de-watering the conduit or removing a portion of the conduit.

Yet another object of the present invention is to seal a leaking bell joint by tightly wrapping a conformable, compressible gasket material about the bell joint and tightly confining the gasket material by means of a closed clamp structure disposed thereabout so that it assumes the shape and contour of the bell joint and prevents further leakage therefrom.

A further object of the present invention is to provide a low cost, lightweight, easily applied, and highly reliable repair clamp for sealing a leaking bell joint.

A still further object of the present invention is to provide a corrosion-resistant bell joint repair clamp which is prefabricated as a unit for ease of installation directly on a leaking bell joint.

These objects of the present invention are achieved and the disadvantages of the prior art are eliminated by a repair clamp for sealing a leak in a bell joint formed of a spigot end of a first pipe and a bell end of a second pipe, the repair clamp comprising: a cylindrical sleeve disposed about the bell joint; a deformable gasket arrangement disposed intermediate and engaging an inner portion of the cylindrical sleeve and the bell joint; and first and second sealing structures respectively disposed about the first and second pipes and coupled to respective ends of the cylindrical sleeve for enclosing and compressing the gasket arrangement whereby the gasket arrangement is maintained in intimate contact with the spigot end of the first pipe and the bell end of the second pipe for sealing a leak in the bell joint.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
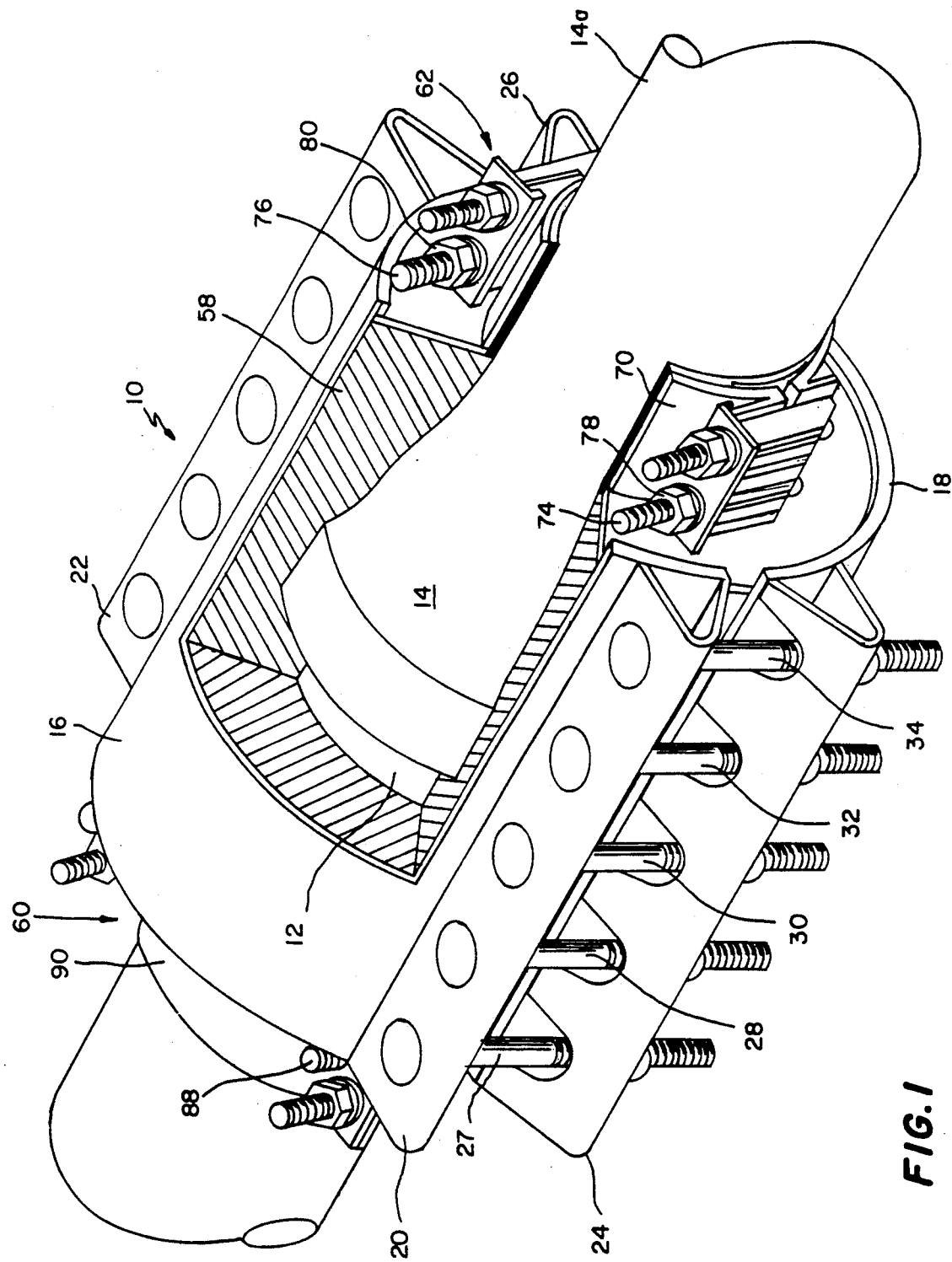
FIG. 1 is a partially cutaway perspective view of a bell joint repair clamp in a pipeline in accordance with the principles of the present invention.
Figure 2:
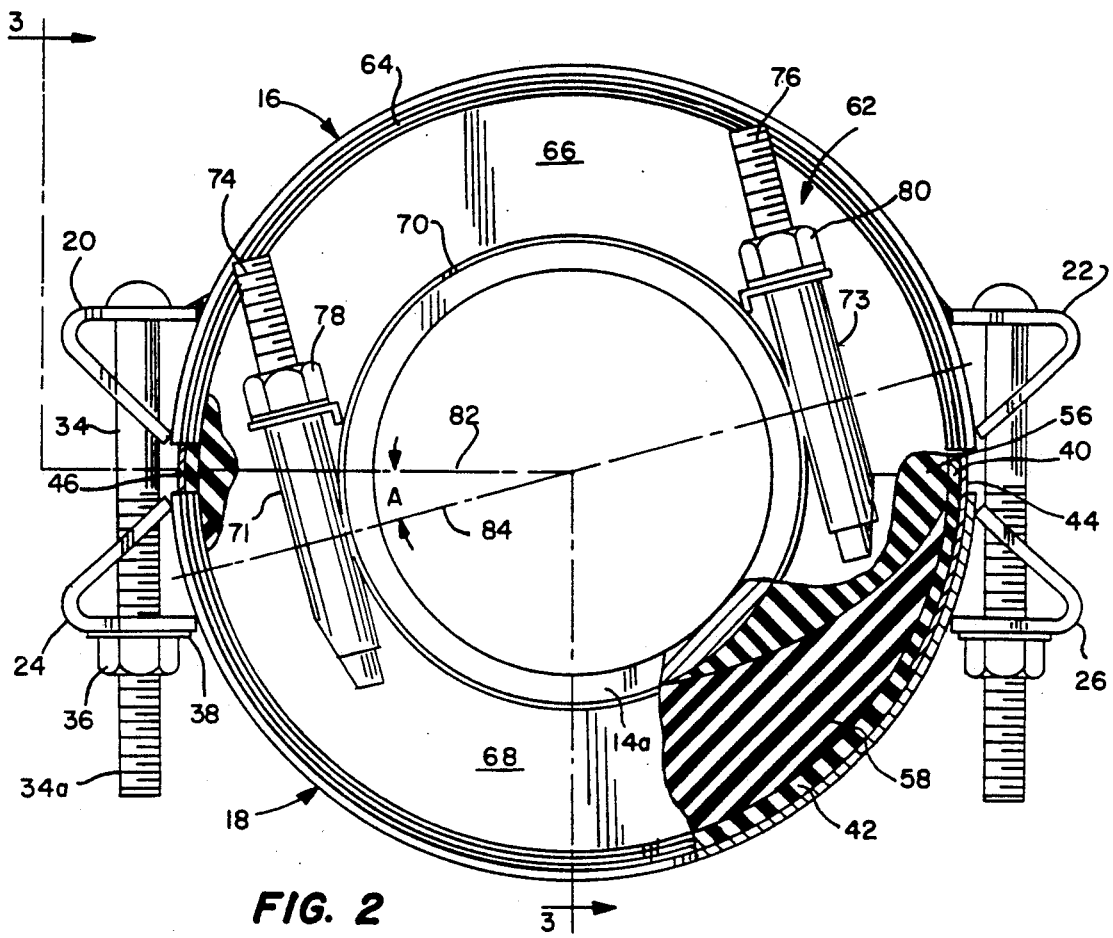
FIG. 2 is an end-on view shown partially cutaway of the bell joint repair clamp of FIG. 1.
Figure 3:
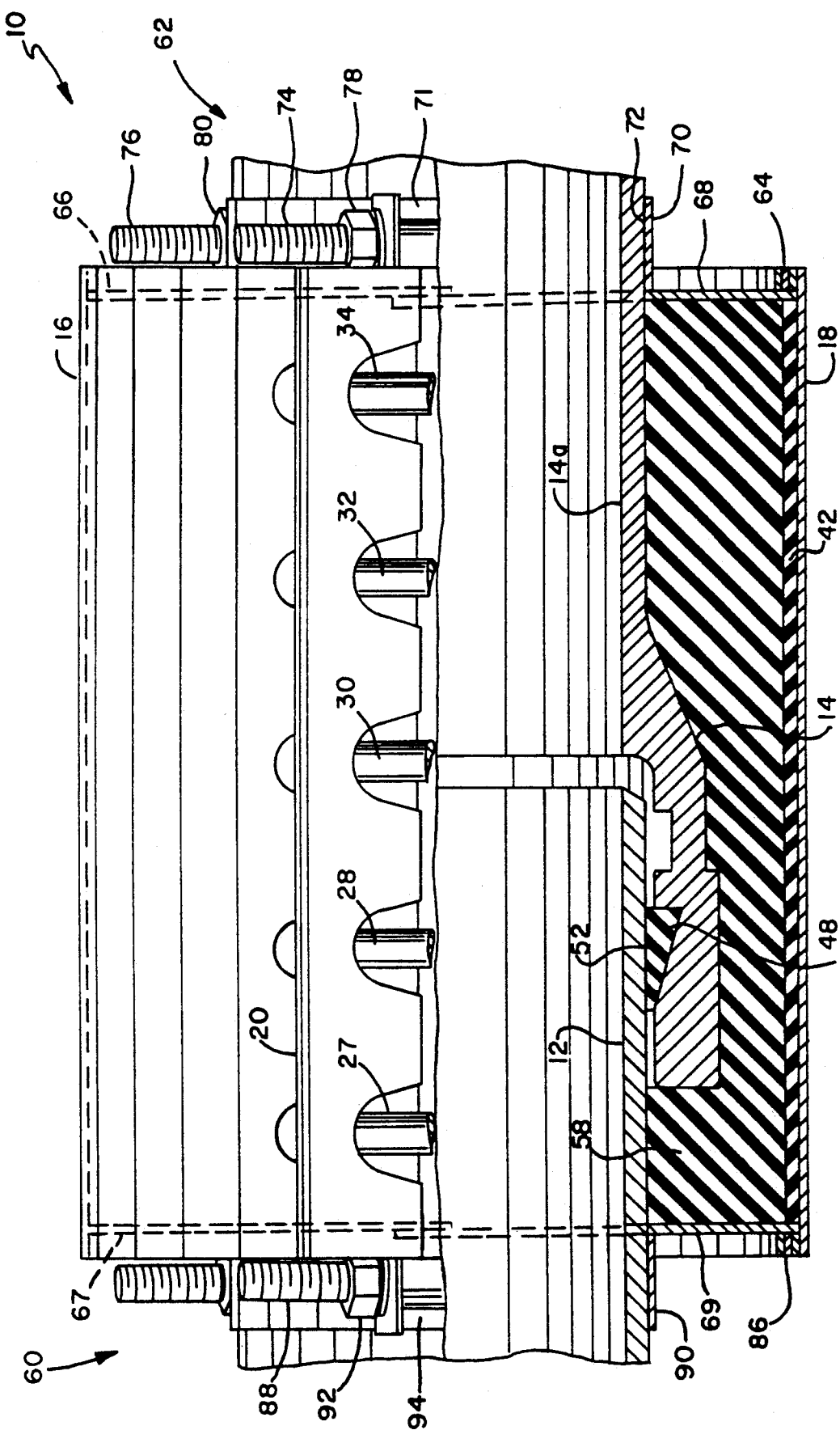
FIG. 3 is a side elevation view shown partially in section of the bell joint repair clamp shown in FIG. 2 taken along site line 3—3 therein.

Referring to FIGS. 1, 2 and 3, there are shown various views of a bell joint repair clamp 10 in accordance with the principles of the present invention. FIG. 1 is a partially cutaway perspective view of the bell clamp 10, while FIG. 2 is an end-on view shown partially cutaway of the bell joint repair clamp. FIG. 3 is a side elevation view shown partially in section of the bell joint repair clamp 10 of FIG. 2 taken along site line 3—3 therein.

Bell joint repair clamp 10 is adapted for coupling in a sealed manner the spigot end 12 of a first pipe and the bell end 14 of a second pipe which also includes a barrel portion 14a. The bell joint repair clamp 10 includes first and second semi-cylindrical sleeve members 16 and 18 preferably comprised of a high strength, corrosion resistant metal such as stainless steel. The first and second sleeve members 16, 18 are adapted for positioning along respective lateral edges thereof in abutting contact to form a cylindrical structure having a generally circular cross section. First and second lug members 20 and 22 are disposed along respective lateral edges of the first sleeve member 16. Similarly, third and fourth lug members 24 and 26 are disposed along respective lateral edges of the second sleeve member 18. Each of the aforementioned lug members is also preferably comprised of a high strength, corrosion resistant metal and is attached to its associated sleeve member by conventional means such as welding. Each of the aforementioned lug members is generally V-shaped and extends along the length of the respective sleeve member to which it is attached. Each of the aforementioned lug members further includes a plurality of spaced apertures along the length thereof, with each of these apertures adapted for receiving a respective nut and bolt combination for securely connecting the first and second sleeve members 16, 18 together. Thus, as shown in FIG. 3, a plurality of bolts 27, 28, 30, 32 and 34 are inserted through respective aligned apertures in lug members 20 and 24 and are maintained in position by means of a respective nut 36 which is shown disposed upon a threaded portion 34a of bolt 34. A washer 38 is preferably positioned intermediate nut 36 and lug member 24. A similar plurality of nut and bolt combinations securely couple lug members 22 and 26 along the lengths thereof as shown in FIG. 1. Bell joint repair clamp 10 is assembled by thus securely coupling adjacent lug members on the first and second sleeve members 16, 18 which are concentrically disposed about the pipeline which is to be repaired.

Disposed on respective ends of the bell joint repair clamp 10 are respective pairs of first and second semi-circular retaining plates 66, 68 and 67, 69. Thus, on the left end of the ball joint repair clamp 10 as shown in FIG. 3, first and second semi-circular retaining plates 67 and 69 are disposed over the open end of the clamp and concentrically about the spigot end 12 of the first pipe. Similarly, on the left end of the bell joint repair clamp 10, first and second semi-circular retaining plates 66 and 68 are disposed concentrically about the barrel portion 14a of the second pipe so as to cover the open end of the repair clamp. Adjacent semi-circular retaining plates are preferably arranged in an overlapping manner along a medial plane through the connected pipes. A first laminated retaining ring 64 is securely attached by conventional means such as welding to the facing inner surfaces of the first and second sleeve members 16, 18 adjacent the edges thereof as well as to retaining plates 66 and 68. The first laminated retaining ring 64 maintains the first and second semi-circular retaining plates 66, 68 securely in position within the bell joint repair clamp 10. Similarly, a second laminated retaining ring 86 securely attached to opposed end portions of the first and second sleeve members 16, 18 as well as to retaining plates 67 and 69 securely maintains the plates in position within the bell joint repair clamp 10.

As shown in FIG. 3, the spigot end 12 of the first pipe is inserted in the bell end 14 of the second pipe in a tight-fitting manner. Disposed about an inner portion of the bell end 14 of the second pipe is an inner recess 48. Inner recess 48 is adapted to receive a gasket member 52. With the spigot end 12 of the first pipe inserted in the bell end 14 of the second pipe, gasket member 52 disposed therebetween in a tight-fitting manner provides a seal between the two pipes.

Disposed about the spigot end 12 of the first pipe and on one end of the bell joint repair clamp 10 is a first end clamp 60. The first end clamp 60 is securely attached to semi-circular retaining plates 67 and 69 by conventional means such as welding. Similarly, disposed about the barrel portion 14a of the second pipe and on a second end of the bell joint repair clamp 10 is a second end clamp 62. The second end clamp 62 is similarly attached to semi-circular retaining plates 66 and 68 on the end of the bell joint repair clamp 10. Details of the second end clamp 62 will now be described, it being understood that the first end clamp 60 is of similar structure and function. The second end clamp 62 includes a restraining band clamp 70 disposed in tight-fitting relation about the barrel portion 14a of the second pipe. Restraining band clamp 70 is securely attached to the semi-circular retaining plates 66 and 68 such as by welding. Attached to diametrically opposed portions of restraining band clamp 70 are first and second side flanges 71 and 73. Attached to the first side flange 71 is the combination of a bolt 74 and nut 78. Similarly, attached to the second side flange 73 is the combination of a bolt 76 and nut 80. Tightening of nuts 78 and 80 causes the restraining band clamp 70 to tighten around the barrel portion 14a of the second pipe. It should be noted here that the embodiment of the invention shown in FIG. 1 includes four (4) nut and bolt combinations for attaching each of the restraining band clamps 70 and 90 to a respective pipeline section, although two such nut and bolt combinations for each restraining band clamp are shown in the embodiment of FIGS. 2 and 3. The embodiment of FIG. 1 provides more secure coupling between the restraining band clamp and the pipeline section to which it is connected. A gasket 72 is disposed intermediate the barrel portion 14a of the second pipe and the restraining band clamp 70 to provide sealed engagement therebetween. The combination of semi-circular retaining plates 66 and 68, laminated retaining ring 64, and the second end clamp 62 provides a leak-proof, sealed connection between the bell joint repair clamp 10 and the barrel portion 14a of the second pipe. Similarly, the combination of semi-circular retaining plates 67 and 69, laminated retaining ring 86 and the first end clamp 60 affords sealed engagement of a second end of the bell joint repair clamp 10 with the spigot end 12 of the first pipe. As shown in FIG. 3, the first end clamp 60 includes a restraining band clamp 90, a pair of side flanges 94, and a pair of nut 92 and bolt 88 combinations for securely engaging the spigot end 12 of the first pipe in a sealed manner. As shown in FIG. 2, line 82 representing the line of connection between the first and second sleeve members 16, 18 and line 84 representing the line of connection between the semi-circular retaining plates 66, 68 are angularly offset from one another by an angle A in a preferred embodiment. This angular offset of the lines of connection, or interface lines, ensures high strength of the seals at both ends of the bell joint repair clamp 10.

When the first and second sleeve members 16, 18 are installed on the bell joint, a gasket means is provided to form a seal along the opposed joints between the sleeve members. The gasket means as shown in FIG. 2 comprises a first gasket member 40 for the first sleeve member 16 and a second gasket member 42 for the second sleeve member 18. Both gasket members 40, 42 are preferably comprised of an elastomeric material and extend the length of the bell joint repair clamp 10, with the first gasket member 40 bonded to the inner surface of the first sleeve member 16 and the second gasket member 42 bonded to the inner surface of the second sleeve member 18. The first and second gasket members 40, 42 are arranged in an overlapping manner in opposed lateral portions of the bell joint repair clamp 10 in the spaces between adjacent edges of the first and second sleeve members 16, 18. Extending longitudinally along the bell joint repair clamp 10 and subtending the gap between adjacent edges of the first and second sleeve members 16, 18 are first and second armor plates 44 and 46. Armor plates 44, 46 are preferably comprised of sheet metal and are disposed intermediate the gasket members 40, 42 and the sleeve members 16, 18. The combination of the first and second gasket members 40, 42 and first and second armor plates 44, 46 provide a strong, tight seal between adjacent edges of the first and second sleeve members 16 and 18.

Figure 4:
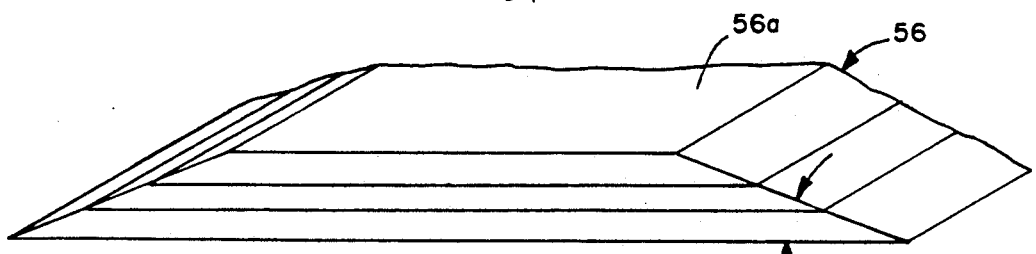
FIGS. 4 and 5 are partial perspective views of end portions of first and second elastomeric sealing gaskets, respectively, used in the bell joint repair clamp of the present invention.
Figure 5:
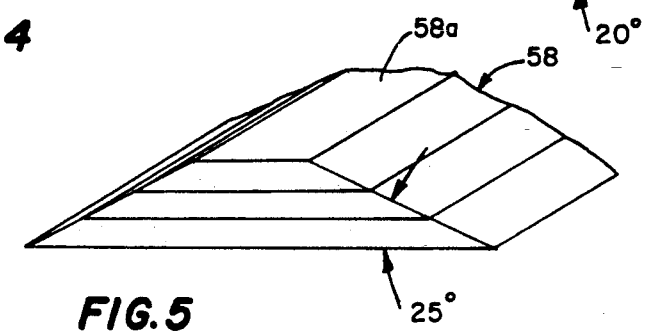

Disposed about the spigot end 12 of the first pipe and the bell end 14 of the second pipe and within the first and second sleeve members 16, 18 are first and second sealing gaskets 56 and 58. Each of the sealing gaskets 56 and 58 has a generally trapezoidal lengthwise cross section as shown in the partial perspective views of the end portions of the sealing gaskets in FIGS. 4 and 5. The first and second sealing gaskets 56, 58 are wrapped lengthwise about the bell joint and they are maintained in intimate contact with the two pipe ends by means of the first and second sleeve members 16, 18. The retaining plates on each end of the bell joint repair clamp 10 prevent movement of the first and second sealing gaskets 56, 58 along the length of the pipes and provide a sealed housing for enclosing the two sealing gaskets and maintaining these gaskets in intimate contact with the bell joint about its periphery. The first and second sealing gaskets 56, 58 are preferably comprised of a compressible, resilient, conformable material such as rubber or neoprene, permitting the sealing gaskets to closely conform to the irregular contour of the bell joint. As shown in FIG. 4, each of the tapered sides of the larger first sealing gasket 56 form an angle of approximately 20° with its bottom surface. Similarly, the tapered sides of the smaller second sealing gasket 58 form an angle of approximately 25° with its bottom surface. The first and second sealing gaskets 56, 58 are positioned within the bell joint repair clamp 10 so that their respective upper surfaces as shown in FIGS. 4 and 5 are in contact with the first and second pipes along the length thereof in the vicinity of the bell joint. For example, the upper surface 56a of the first sealing gasket 56 is aligned along the length of the two pipes and is wrapped around an upper portion of these pipes so as to cover the bell joint. Similarly, the upper surface 58a of the second sealing gasket 58 is positioned in intimate contact with and along the length of a lower portion of the first and second pipes in the vicinity of the bell joint. Each of the sealing gaskets 56 and 58 is wrapped around the bell joint such that the respective tapered sides of the gaskets are in intimate contact permitting the two sealing gaskets to fully enclose and tightly engage the bell joint about the periphery thereof. The first and second sealing gaskets 56, 58 thus seal any cracks in the bell end 14 of the second pipe or any leaks between the two pipes such as caused by failure of either the first or second gasket members or a hole in either pipe end.

There has thus been shown a bell joint repair clamp which is relatively inexpensive and is easily manufactured and installed on a leaking pipeline bell joint without de-watering the pipeline or cutting out the bell joint. The bell joint repair clamp is lightweight and provides a double seal about the bell joint in the form of an inner elastomeric gasket and an outer closed housing disposed about the bell joint in a sealed manner. The gasket is maintained in tight-fitting engagement about the bell joint by means of a pair of semi-cylindrical coupled sleeve members, retaining plates on each end of the cylindrical sleeve member combination, and pipe engaging clamps connected to the end retaining plates for providing a seal between the retaining plates and the two pipes connected via the bell joint.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A repair clamp for sealing a leak in a bell joint formed of a spigot end of a first pipe and a bell end of a second pipe, said repair clamp comprising:

a cylindrical sleeve disposed about the bell joint;

deformable gasket means disposed intermediate and engaging an inner portion of said cylindrical sleeve and the bell joint; and first and second sealing means respectively disposed about the first and second pipes and coupled to respective ends of said cylindrical sleeve for enclosing and confining said gasket means whereby said gasket means is maintained in intimate contact with the spigot end of the first pipe and the bell end of the second pipe for sealing a leak in the bell joint, wherein said deformable gasket means includes first and second gaskets extending between said first and second sealing means and disposed about the spigot end of the first pipe and the bell end of the second pipe, and wherein each of said first and second gaskets has a generally trapezoidal cross section and includes facing tapered side portions, and wherein the tapered side portions of said first gasket are positioned in contact with the tapered side portions of said second gasket.

2. The repair clamp of claim 1 wherein each of said first and second gaskets further includes first narrow and second wide side portions parallel to one another, and wherein said first narrow side portion of each of said first and second gaskets engages the spigot end of the first pipe and the bell end of the second pipe.

3. The repair clamp of claim 2 wherein said first gasket is wider than said second gasket and wherein the tapered side portions of said first gasket form an angle on the order of 20° with an adjacent wide side portion of said first gasket and the tapered side portions of said second gasket form an angle on the order of 25° with an adjacent wide side portion of said second gasket.

4. The repair clamp of claim 1 wherein said deformable gasket means is comprised of rubber or neoprene.

5. The repair clamp of claim 1 wherein said cylindrical sleeve includes first and second semi-cylindrical sleeve members coupled together along the respective lengths thereof.

6. The repair clamp of claim 6 further including connecting means for securely coupling said first and second sleeve members together in a sealed manner.

7. The repair clamp of claim 7 wherein said connecting means includes a plurality of lugs and connecting nuts and bolts.

8. The repair clamp of claim 7 wherein said connecting means further includes first and second semi-cylindrical gaskets disposed intermediate said first and second sleeve members, respectively, and said gasket means.

9. The repair clamp of claim 8 further including first and second armor plates disposed over adjacent portions of said first and second semi-cylindrical sleeve members.

10. The repair clamp of claim 1 wherein said first and second sealing means include respective retaining plates coupled to and extending over a respective open end of said cylindrical sleeve.

11. The repair clamp of claim 10 wherein said first and second sealing means each include first and second generally semi-circular plates extending between a respective pipe and said cylindrical sleeve and forming a seal therebetween.

12. The repair clamp of claim 11 wherein said first and second sealing means further includes first and second clamp means, respectively, for securely engaging a respective pipe in a sealed manner.

13. The repair clamp of claim 12 wherein each of said first and second clamp means is coupled to a respective pair of first and second generally semi-circular plates.

14. The repair clamp of claim 13 further including first and second retaining rings respectively coupled to said first semi-circular plates and to said second semi-circular plates and further coupled to respective end portions of said cylindrical sleeve for securely connecting said plates to said cylindrical sleeve.

15. For sealing a leak in a pipe bell joint formed of a spigot end of a first pipe and a bell end of a second pipe, the combination comprising:

a generally cylindrical housing including first and second semi-cylindrical sleeve members and first and second retaining members disposed on respective ends of said first and second sleeve members;

first and second gaskets extending between said first and second retaining members and disposed about the spigot end of the first pipe and the bell end of the second pipe, wherein said first and second gaskets are comprised of a deformable, compressible material for conforming to an outer surface of the pipe bell joint and wherein each of said first and second gaskets has a generally trapezoidal cross section and includes facing tapered side portions, and wherein the tapered side portions of said first gasket are positioned in contact with the tapered side portions of said second gasket;

first and second coupling means for securely coupling said first and second sleeve members about the pipe bell joint, whereby said cylindrical housing encloses and urges said first and second gaskets in a tight-fitting manner against the bell joint so as to seal a leak therein; and third and fourth coupling means for connecting said first and second retaining members in a sealed manner to said first and second pipes, respectively.

* * * * *

UNITED STATES PATENT AND TRADEMARK OFFICE
CERTIFICATE OF CORRECTION

PATENT NO. : 5,288,108
DATED      : February 22, 1994
INVENTOR(S) : Sam Eskew and William L. Kane It is certified that error appears in the above-identified patent and that said Letters Patent is hereby corrected as shown below:

IN THE CLAIMS:

| COLUMN | LINE | |
|---|---|---|
| 7 | 9  | "6" should be --5-- |
| 7 | 13 | "7" should be --6-- |
| 8 | 23 | After "joint" insert --, -- |
| 8 | 34 | After "and", a new paragraph should start |

Signed and Sealed this

Fifth Day of July, 1994

BRUCE LEHMAN

Attest:

Attesting Officer

Commissioner of Patents and Trademarks